G. Z. CLARK.
SLED RUNNER ATTACHMENT FOR AUTOMOBILES.
APPLICATION FILED APR. 18, 1916.
1,206,671. Patented Nov. 28, 1916.
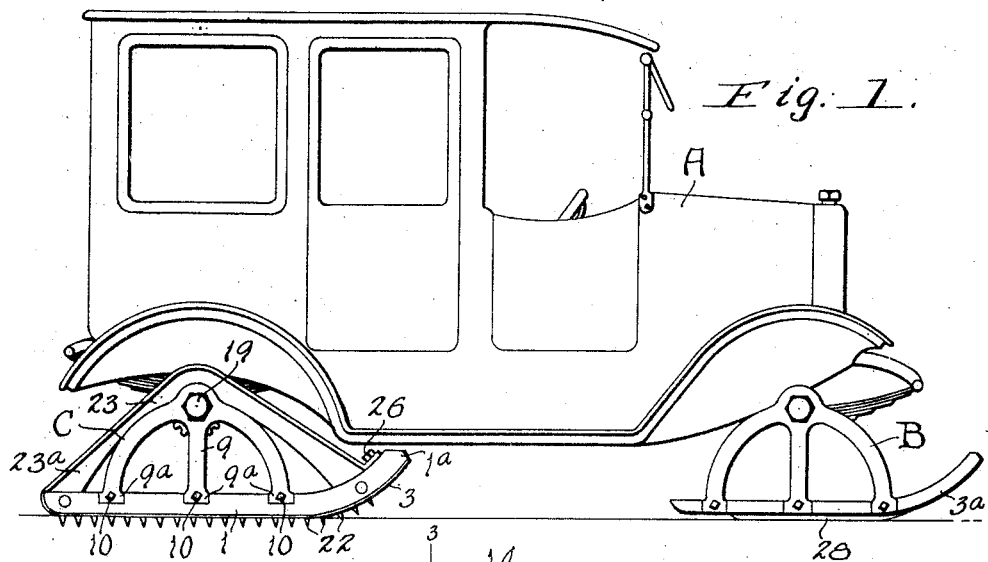
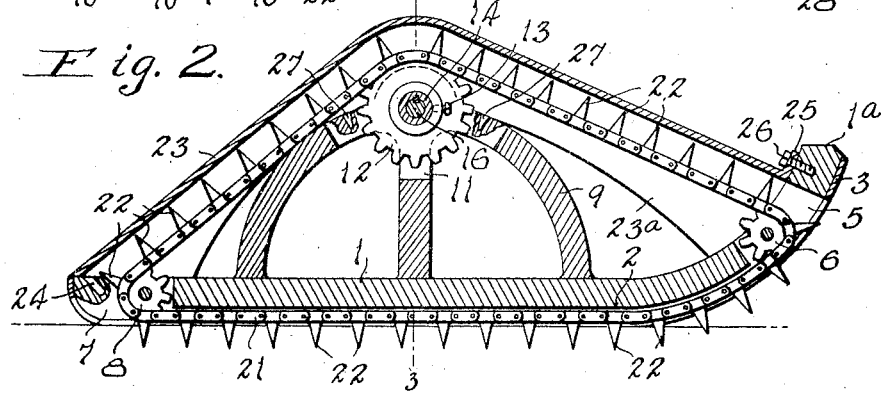
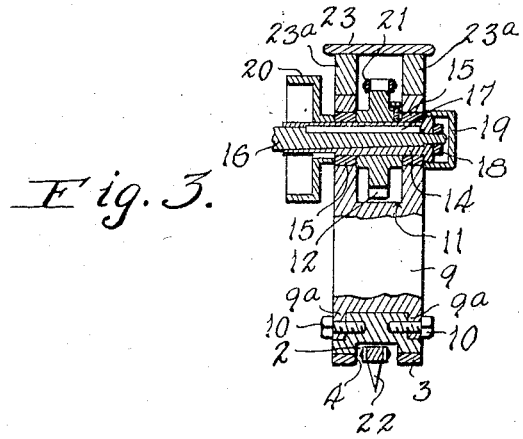
Inventor
G. Z. CLARK
By
H. S. Steele
Attorney

UNITED STATES PATENT OFFICE.

GUY Z. CLARK, OF DAVENPORT, WASHINGTON, ASSIGNOR OF ONE-HALF TO LAUSEN S. WEST, OF DAVENPORT, WASHINGTON.

SLED-RUNNER ATTACHMENT FOR AUTOMOBILES.

1,206,671.  Specification of Letters Patent.  Patented Nov. 28, 1916.

Application filed April 18, 1916. Serial No. 91,885.

*To all whom it may concern:*

Be it known that I, GUY Z. CLARK, a citizen of the United States, residing at Davenport, in the county of Lincoln, State of Washington, have invented a new and useful Sled-Runner Attachment for Automobiles; and I do hereby declare the following to be a full, clear, and exact description of the invention, such as will enable others skilled in the art to which it appertains to make and use the same.

The present invention relates to a sled runner attachment for automobiles, and has for its object to provide a device of this character which embodies novel features of construction whereby it can be readily mounted upon the axles of a motor vehicle after the wheels have been removed therefrom, thereby enabling the vehicle to be readily used upon snow and ice.

Further objects of the invention are to provide a sled runner attachment for motor vehicles which is comparatively simple and inexpensive in its construction, which admits of the standard braking system of the car being used, so that the car is at all times under perfect control, and which is so constructed that all of the parts are readily accessible and repairs can be easily made whenever necessary.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a motor vehicle provided with a sled runner attachment constructed in accordance with the invention. Fig. 2 is an enlarged longitudinal sectional view through the sled runner attachment which is applied to the rear axle. Fig. 3 is a transverse vertical sectional view on the line 3—3 of Fig. 2.

Corresponding and like parts are referred to in the following description and indicated in all the views of the drawings by the same reference characters.

Referring to the drawings, the reference character A designates a conventional motor vehicle from which the wheels have been removed, the sled runner attachments B being applied to the front axle thereof, and the sled runner attachments C being applied to the rear or drive axle thereof. The members C each include a runner 1 which has the forward end thereof curved upwardly, as indicated at $1^a$. The base of the runner and the lower portion of the upturned end $1^a$ thereof is provided with a longitudinal chain receiving groove 2, and the shoe 3, which is applied to the lower face of the runner, is formed with a longitudinal slot 4 corresponding to the groove 2. An opening 5 is formed in the upturned end of the runner, said opening having a sprocket wheel 6 journaled therein. A similar opening 7 is provided at a point adjacent to the rear end of the runner 1, said opening having a sprocket wheel 8 journaled therein.

Projecting upwardly from each runner 1 is an arched frame 9, said frame being formed with a series of three downwardly extending arms which have the lower extremities thereof bifurcated at $9^a$ to straddle the runner, and secured thereto by suitable fastening members 10. The upper end of the arched frame is provided with a recess 11 which extends downwardly from the top thereof and within which a master sprocket wheel 12 is arranged. This sprocket wheel 12 is rigidly secured in some suitable manner as by means of a set screw 13 to a sleeve 14 which is journaled within suitable bearings 15 on the arched standard 9. This sleeve is adapted to be fitted upon the rear axle 16 of the motor vehicle in exactly the same manner that the rear wheel is applied thereto, a keyed connection 17 being shown as provided for locking the two members together. The usual nuts 18 and cap 19 are also shown as applied to the extremity of the axle. The inner end of the sleeve 14 projects beyond the side of the arched standard 9 and has the brake drum 20 rigidly applied thereto, said brake drum being identical in size and shape with the brake drum of the wheel, so that the standard brake bands of the motor vehicle can be arranged to operate thereon in the usual manner.

An endless chain 21 extends around the master sprocket wheel 12 and the two smaller sprocket wheels 6 and 8, the lower reach of the endless chain traveling along the groove 2 in the base of the runner 1. This chain 21 is provided with a series of studs 22 which project outwardly therefrom and are adapted to engage the snow or ice under the runner for the purpose of propelling the car in either a forward or a backward direction. The regular power mechanism of the car can thus be used to drive the chains 21 and propel the car in a forward or backward direction, and the regular brake mechanism of the car can be employed for retarding the movements thereof in either a backward or a forward direction, thereby placing the car under the perfect control of the operator.

An arched chain guard 23 fits removably over the upper reaches of the chain 21 of each of the runners. The guard 23 has a channel shaped cross section, being provided with side flanges 23ª which project downwardly on opposite sides of the chain in such a manner as to effectively prevent mud and dirt from accumulating thereon. One end of the arched guard 23 is provided with a pair of inwardly inclined positioning pins 24 which are adapted to engage correspondingly inclined openings in the heel of the runner, while the opposite end of the arched guard 23 terminates in a laterally projecting ear 25 which is secured to the toe of the runner by a detachable fastening member 26. When this fastening member or bolt 26 is in position the chain guard 23 is securely held against displacement, since the inwardly inclined pins 24 can only be disengaged from their openings after the fastening member 26 has been removed. At the top of the arched chain guard 23, the edges of the side flanges 23ª thereof are cut away to fit accurately against the top of the frame member 9 and, on opposite sides of the master sprocket wheel 12, said flanges 23ª are provided with positioning pins 27 which engage corresponding openings in the main frame or standard 9. The chain guard 23 can thus be very quickly removed by first unscrewing the single fastening bolt 26, and access may then be obtained to the chain and sprocket mechanism for the purpose of cleaning or repairing the same.

The forward sled runner attachments B are substantially the same as the rear attachments C, with the exception that the chain and sprocket drive mechanisms are omitted. The shoe 3ª of each forward attachment B, instead of being longitudinally slotted, as in the previous instance, is provided with a downwardly extending longitudinal rib 28 which serves to prevent lateral movement or skidding.

Having thus described the invention, what I claim as new and desire to secure by Letters Patent, is:—

1. A sled runner attachment for automobiles, including a runner, a standard projecting from the runner, a drive sprocket journaled upon the standard, a drive chain engaging the drive sprocket and passing under the runner, guide sprockets at opposite ends of the runner for engagement with the drive chain, an arched channel shaped chain guard fitting over the standard and detachably connected at its ends to the runner, and positioning members at the middle portion of the arched chain guard for engaging the standard to prevent lateral displacement of the chain guard.

2. A sled runner attachment for automobiles, including a runner, a standard projecting from the runner, a drive sprocket journaled upon the standard, a drive chain engaging the drive sprocket and passing under the runner, guide sprockets journaled upon the runner at opposite ends thereof and engaging the drive chain, an arched channel shaped chain guard fitting over the standard and provided at one end thereof with a laterally projecting ear, one end of the runner being provided with inclined openings adapted to removably receive the inclined pins of the chain guard, and a fastening member for securing the ear to the runner.

3. A sled runner attachment for automobiles, including a runner, a standard projecting from the runner, a drive sprocket journaled upon the standard, a drive chain engaging the drive sprocket and passing under the runner, guide sprockets mounted upon opposite ends of the runner and engaging the drive chain, an arched channel shaped chain guard fitting over the standard and provided at one end thereof with inwardly inclined pins, positioning pins projecting from the middle portion of the chain guard, and a fastening member for detachably securing the opposite end of the chain guard to the runner, the runner and standard respectively being provided with openings to receive the inclined end pins and intermediate positioning pins of the chain guard.

4. A sled runner attachment for automobiles, including a runner, a standard projecting from the runner, a drive sprocket journaled upon the standard, a drive chain engaging the drive sprocket and passing under the runner, guide sprockets journaled upon the runner and engaging the drive chain, an arched channel shaped chain guard fitting over the standard, and provided at one end thereof with inwardly inclined pins and at the opposite end thereof with a laterally projecting ear, the flanges of the chain guard at the middle portion thereof being cut away and shaped to fit accurately against the top of the standard, positioning pins projecting from the flanges of the chain guard, and a fastening member for detachably securing the ear of the chain guard to the runner, the runner and standard respectively being provided with openings to receive the inclined pins and positioning pins of the chain guard.

In testimony whereof I have signed my name to this specification in the presence of two subscribing witnesses.

GUY Z. CLARK.

Witnesses:
E. N. INNES,
C. W. JARVIS.